M. BRANCO.
WHEEL LOCK.
APPLICATION FILED APR. 5, 1920.

1,388,322. Patented Aug. 23, 1921.

Inventor
Michael Branco
By W. W. Williamson
Atty

UNITED STATES PATENT OFFICE.

MICHAEL BRANCO, OF NORRISTOWN, PENNSYLVANIA.

WHEEL-LOCK.

1,388,322.

Specification of Letters Patent.   Patented Aug. 23, 1921.

Application filed April 5, 1920.   Serial No. 371,185.

*To all whom it may concern:*

Be it known that I, MICHAEL BRANCO, a citizen of the United States, residing at Norristown, in the county of Montgomery and State of Pennsylvania, have invented new and useful Improvements in Wheel-Locks, of which the following is a specification.

My invention relates to new and useful improvements in wheel locks, and has for its object to provide an exceedingly simple and effective device of this character which is particularly adapted for use with automobiles whereby one or more of the wheels thereof may be locked to prevent the unauthorized use of the automobile by any person other than the one provided with means for removing the wheel lock.

Another object of the invention is to provide a device of this character which may be readily and quickly attached to a wheel or wheels, said device comprising a body having a chamber for the reception of a portion of the wheel and provided with projections to rest upon the road bed so as to prevent sliding should any attempt be made to tow or otherwise remove the vehicle.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

In carrying out my invention as here embodied, 2 represents the wheel lock comprising a body 3 of any suitable material and preferably triangular in side elevation, said body having a chamber 4 in the form of an arcuate slot adapted to receive a wheel 5, the wheel proper and the tire being here termed as the wheel for the convenience of illustration and description. When the chamber 4 is formed in the body 3, two side flanges 6 are formed which engage each side of the wheel which will prevent the wheel lock being thrown to either side of the wheel.

Figure 1:
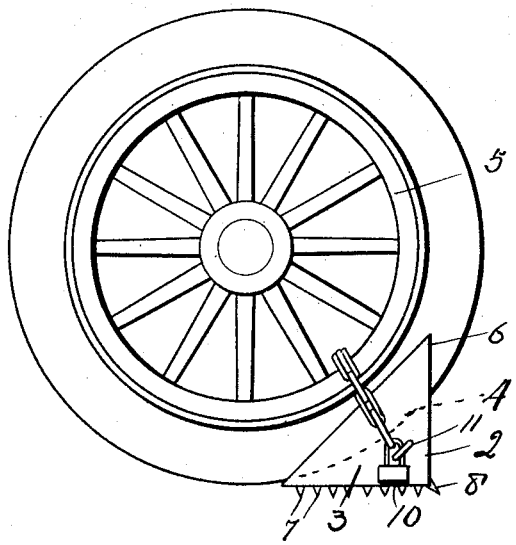
Figure 1, is a side elevation of a wheel showing my wheel lock attached thereto.
Figure 2:
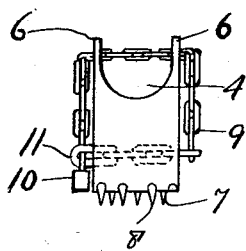
Fig. 2, is an end view thereof.
Figure 3:
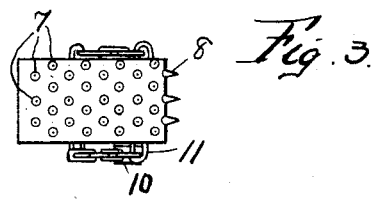
Fig. 3, is a bottom plan view.

On the bottom of the body 3 are formed suitable projections 7 here represented as sharpened prongs or barbs, and these are perfectly arranged in transverse rows with the projections in one row arranged in staggered relation to those of the adjacent row or rows, while at one end of the body are formed other prongs 8 which project downwardly and outwardly at an angle to the other projections as plainly shown in Fig. 1 so that should any one attempt to move the vehicle these projections will dig into the road bed instead of sliding thereover and causing the wheel to which the wheel lock is fastened to rise in the air immediately indicating that an unauthorized person is attempting to take the vehicle away.

Suitable means is provided for fastening the locking device to a wheel, and said means preferably comprising a chain one end of which is permanently fastened to the wheel lock while the other end after being passed around the wheel is detachably fastened by means of a lock 10 to a link 11 or an eye, and said link may be part of the chain 9 when said chain is cast in the body of the wheel lock as here shown.

In practice when a person wishes to lock his vehicle against unauthorized use it is only necessary to place one of the wheel locks against a wheel so that a portion thereof enters the chamber 4 and by placing the chain around the wheel between two of the spokes it may be readily and quickly locked in place against the wheel. Then should any one attempt to move the vehicle the projections will form a drag which will prevent the proper operation or towing of the vehicle and even though it is possible to move the vehicle a short distance the wheel lock will indicate that an unauthorized person is attempting to use the same.

Of course I do not wish to be limited to the exact details of construction as herein shown as these may be varied within the limits of the appended claim without departing from the spirit of my invention.

Having thus fully described my invention, what I claim as new and useful is:—

A wheel lock consisting of a triangular shaped body having a chamber adapted to register with a portion of a wheel, means for attaching the wheel lock to a wheel, projections extending from the base wall of said body and other projections extending at an angle from the corner produced at the meeting point of the base with the upright wall.

In testimony whereof, I have hereunto affixed my signature.

MICHAEL BRANCO.